3,505,278
CERAMIC MOLDING COMPOSITION
Vito D. Elarde, 6429 Lance Court, San Diego, Calif. 92120; Edward A. Potocki, 2620 Kensington St., Westchester, Ill. 60153; and Henry M. Gajewski, 7417 Lyons St., Morton Grove, Ill. 60053
No Drawing. Continuation-in-part of application Ser. No. 404,507, Oct. 16, 1964. This application Dec. 11, 1967, Ser. No. 689,252
Int. Cl. C04b 25/06
U.S. Cl. 260—37    4 Claims

ABSTRACT OF THE DISCLOSURE

A ceramic molding composition for the production of a fired water resistant dense ceramic article comprising a mixture of a silicone resin with a major amount of a refractory ceramic material and a minor amount of a ceramic material having a lower fusion temperature. The refractory ceramic may be viz., alumina, and the low fusion ceramic may be viz., a mineral silicate or a mixture of wollastonite and a lead borosilicate glass frit. The mixture is molded under pressure and heat sufficient to thermoset the silicone resin, and then may be fired.

---

This application is a continuation-in-part of applicant's co-pending application Ser. No. 404,507, filed Oct. 16, 1964, now Patent 3,361,583 issued Jan. 2, 1968, wherein the molding composition and process of the instant application is disclosed but not claimed; said prior application claiming the process of making the fired ceramic article and the article obtained.

The invention relates to a ceramic molding composition and process. More particularly it relates to a plastic ceramic composition.

Hitherto plastic ceramic compositions have been made in which substantial shrinkage, linear shrinkage, takes place during molding and firing. Furthermore the shrinkage is nonuniform so that precision molded and fired ceramics are difficult, if not impossible, to make.

In accordance with a preferred embodiment of the invention, wherein minimum shrinkage and high density are attained, a base composition consisting of a major proportion of alumina with minor amounts of wollastonite and a lead borosilicate glass frit was ball milled several hours to obtain a uniform mixture of —325 mesh. This powdered composition was intimately mixed with a toluene solution of a silicone resin containing a catalyst to promote thermal setting, and a solution of a plasticizer, preferably beeswax. The mixture was spray dried to a dry powder, the dry powder placed in a mold and subjected to sufficient heat and pressure to produce a shaped article and to convert the silicone resin to its thermoset state. The article so made was then fired in a kiln to a temperature of approximately 2000° F., a temperature below the vitrification temperature of the alumina, but sufficiently high to convert the glass frit and wollastonite to the vitreous or glassy (amorphous) state. The shaped product thus consisted of a glassy matrix containing fine particles of alumina uniformly dispersed therein. The linear shrinkage from the molded product in the mold to the finished fired ceramic was less than 3 percent.

In its broad aspect the invention comprises mixing a moldable silicone resin composition with a mixture of a major amount of any ceramic material which either will not vitrify or which has a relatively high vitrification temperature, and a ceramic material having a low temperature of vitrification, molding the mixture into a shaped article and at least partially thermosetting the silicone resin to produce a shaped article having adequate green strength to remove from the mold, then firing the shaped article at a temperature sufficient to vitrify the low temperature vitrifiable ceramic, but insufficient to vitrify the other major ceramic. This process with its composition results in lesser shrinkage than other processes using various other compositions and it is believed this is due, at least in part, to (1) the use of a silicone resin which is about 50 percent converted to silica during firing and (2) maintaining the major ceramic in unvitrified state while forming a vitrified matrix of the other ceramic.

The major ceramic material of the composition which has given particularly satisfactory results is powdered alumina. Examples of other materials which may be used as the major ceramic ingredient are magnesia, zirconia, titania, thoria, beryllia, and silica. Carbides such as carbides of silicon, titanium, zirconium, chromium, tungsten, molybdenum, and other nonwater reactive carbides may be used. Graphite, amorphous carbon, and other materials incapable of being vitrified may also be used.

The material used to form the glassy bond may be any material which vitrifies below the vitrification temperature of the major ceramic material. We have found that particularly satisfactory results are obtained with glass frits, and particularly lead glass frits. One particularly satisfactory lead borosilicate glass frit is known to the art as Thompson's 1046. Another pulverized glass frit which may be used consists approximately in weight percent of 70 percent $SiO_2$, 20 percent $B_2O_2$, and 10 percent $Na_2O$. In addition to such glass frits, of which many are known in the ceramic art, there may be used lower softening materials than the primary ceramic material, including wollastonite (particularly a 50–50 mixture of wollastonite and lead borosilicate), and various other mineral silicates such as mullite, forsterite, feldspar, and the like. Any of the inorganic glasses including window and bottle glass, may be used in powder or fiber form. Likewise, by compounding within the skill of the molding art there may be used vitrifiable materials such as spodumene, steatite, silica, and quartz, care being taken with these and other such materials to use these materials in minor amount with a major amount of a powdered ceramic material which vitrifies at a substantially higher temperature than required to vitrify the minor ingredient.

For minimum shrinkage the silicone resin is essential. The invention in principle could be used with other thermosetting resins such as the epoxy resins and the thermosetting phenolics, but by such materials either undue porosity or shrrinkage is obtained by the elimination of the resin either deliberately before firing or during the firing stage. All types of silicone resins are operable, such as those disclosed in Weyer Patent 3,090,691, especially methyl phenyl polysiloxane, dimethyl and diethyl siloxane and other organosiloxanes, particularly of molecular weight sufficiently high to be solids or resinous nature. However, particularly satisfactory results have been obtained with a trifunctional methyl polysiloxane resin sold by General Electric Company under the trademark SR–80. This resin is sold and used dispersed in toluene and mixed with a zinc octoate catalyst. Other well known catalysts for speeding the thermosetting of the silicone resin may, of course, be used, such as lead naphthenate, lead bisilicate, lead oxide, iron oxide, and the like.

For low shrinkage, the silicone binder should be kept at low level, as for example below 25 weight percent of the composition. Several formulations were tested with various binder levels to determine the minimum level for maintaining the important characteristics of flow and hot strength. It was found that approximately 8 weight percent of silicone resin was the minimum to maintain suitable flow for practical processing.

In order to improve flow characteristics for molding various plasticizers or flow agents should be added. Suitable flow agents include minor proportions of beeswax, butyl stearate, aluminum stearate, calcium stearate, glyceryl monostearate, and silicone greases and oils. The poly lower alkyl methylacrylates such as normal and isobutyl methacrylate modify or plasticize the silicone resin and likewise improve flow characteristics.

However, beeswax was the most effective flow agent. One to two parts by weight (weight percent) of beeswax in a formulation allowed excellent composition flow at various pressures down to 1500 p.s.i. An excess of beeswax, however, produced undue softening of the composition upon completion of the molding cycle.

Additonal catalysts or curing agents to those present in the silicone resin obtained from the manufacturer may be added to the moldable composition to speed the hardening of the silicone resin. These include lead oxide, iron oxide, lead naphthenate, zinc octoate, lead bisilicate, and other such curing agents well known in the art. These are used in small amounts such as less than 1 percent by weight.

The choice of alumina as the key filler was based on several factors. These included high temperature resistance, crack resistance, good electrical properties, and good physical properties. The high alumina compositions also provided a low shrinkage base into which to blend glass frit.

Compositions made with silicones and alumina alone as the filler did not reach vitrification when fired to temperatures as high as 3200° F. Thus, with alumina, minor amounts of many other materials could be used so long as such materials vitrified at below 3200° F., preferably 1500° F. to 2500° F. Such materials include lead borosilicates glass, wollastonite, and other glasses and low temperature softening silicates.

Wollastonite, in addition to vitrifying and making a dense glassy matrix, was found to improve hot strength and reduce water adsorption. This material could be used with or without the glass frit. However, with the glass frit, further reduction in water adsorption was obtained.

The proportions of the various ingredients may be varied widely and, in general, are such that moldability and green strength with a minimum of organic materials are present.

For improved shrinkage characteristics, the ceramic material to be vitrified should be present in minor amount compared to the ceramic material which is to remain unvitrified.

The silicone resin, as above stated, for low shrinkage, should be below approximately 25 percent of hte composition, suitably from 8–25 percent, and preferably 10–25 percent.

The plasticizer for the silicone resin is kept in minor amount, preferably in the smallest amount which will give adequate flow for molding. Such amounts for various plasticizers are well known or within the skill of the art.

The following table shows the preferred and operable ranges in weight percent of a highly satisfactory alumina molding composition of this invention:

| Ingredient | Operable, percent | Preferred, percent |
| --- | --- | --- |
| Silicone resin | 8–25 | 10–15 |
| Alumina powder | 90–50 | 55–70 |
| Wollastonite* | 5–40 | 10–20 |
| Glass frit* | 2–25 | 5–15 |
| Beeswax* | 0.4–5.0 | 0.5–3.0 |

*These materials can be replaced entirely or partly by other materials as above set forth in this application, but we have not obtained such good shrinkage characteristics with such other materials, nor such good flow characteristics, but we have not obtained such good shrinkage characteristics with such other materials, nor such good flow characteristics.

The following is a specific example of the preparation of a vitrified ceramic article from a plastic ceramic composition.

EXAMPLE I

The formula used was as follows:

| | Parts by weight |
| --- | --- |
| Silicone resin (SR–80) | 13 |
| Beeswax | 2 |
| Wollastonite | 15 ⎫ |
| Alumina (—325 mesh) | 60 ⎬ 85 |
| Glass frit (Thompson's 1046) | 10 ⎭ |

In the above formula SR–80 is the trademark of a silicone resin made by General Electric which is a trifunctional methyl polysiloxane having an average molecular weight of 5000 and containing zinc octoate as a catalyst. Thompson's 1046 has been made by applicants and consists of the following:

| | Parts by weight |
| --- | --- |
| Lead bisilicate | 46.1 |
| Boric acid | 42.9 |
| Titanium dioxide | 2.3 |
| Cobalt oxide | 8.1 |
| Chrome oxide | .6 |

These ingredients are mixed and then heated in a crucible to melt and react with the constituents. Then, while in a liquid state, this material is poured into a water bath which causes this glass frit to shatter and collect in small chips. The material is subsequently ball milled to —325 mesh and is used as such in our formula of Example I. The processing was as follows:

(1) The 85 parts by weight of base material was ball milled 16 hours until substantially all material was —325 mesh Tyler screen series.

(2) The pulverized base material was mixed with a solution of silicone resin and beeswax (chlorethylene solvent) in a dispersator for a half hour and then spray dried to a flowable powder.

(3) The powdered composition was compression molded at 320° F. for 5–10 minutes.

(4) The molded heat set article was removed from the mold and fired at 2000° F., held for one hour at 2000° F.

The linear shrinkage in the mold was 1.36 percent. The total linear shrinkage after firing was 2.30 percent. The water absorption of the fired article was .09 percent. The specific gravity was 2.72. The article was a vitrified block consisting of a vitrified or glassy (amorphous) matrix of wollastonite and glass frit containing uniformly dispersed particles of alumina with particles of silica obtained from the heat decomposition of the silicone resin during firing.

Vitrified articles using other ceramic mixtures with silicone resins by molding and firing can be made by one skilled in the art from the description in this specification, using the above example as an aid in compounding and procedure. For example, the alumina of the above example can be replaced with magnesia or silica with operable results, but with minor modifications within the skill of the art for optimum low shrinkage and high density.

The broad product of the invention is an inorganic amorphous matrix containing crystalline particles of a ceramic material including particles of silica obtained from the decomposition of the silicone resin.

We claim:

1. A plastic ceramic composition for the production of water resistant, dense, molded ceramic articles having low shrinkage characteristics consisting essentially in percent by weight of from 50 percent to 90 percent of a refractory ceramic material selected from the group consisting of alumina, magnesia, zirconia, titania, thoria, beryllia, silica, carbon, and carbides of silicon, titanium, zirconium, chromium, tungsten, and molybdenum, from 2 percent to 40 percent of a second ceramic material having a lower fusion temperature than said refractory ceramic material, and the second ceramic material is one of a mineral silicate in from 5 percent to 40 percent and glass frit in from 2 percent to 25 percent and mixtures but limited to said maximum of 40 percent; from 8 percent to 26 percent of a silicone resin, and a plasticizer in plasticizing amount.

2. The composition of claim 1 wherein the second ceramic material is wollastonite.

3. The composition of claim 1 wherein the refractory ceramic material is alumina.

4. The composition of claim 3 wherein the glass frit is a lead borosilicate and the plasticizer is beeswax in 0.4 percent to 5.0 percent by weight of the composition.

References Cited

UNITED STATES PATENTS

| | | | |
|---|---|---|---|
| 2,803,554 | 8/1957 | Fenity et al. | 106—65 |
| 2,887,394 | 5/1959 | Bickford et al. | 106—65 |
| 3,124,542 | 3/1964 | Kohn. | |
| 3,361,583 | 1/1968 | Elarde et al. | 106—39 |

MORRIS LIEBMAN, Primary Examiner

L. T. JACOBS, Assistant Examiner

UNITED STATES PATENT OFFICE
CERTIFICATE OF CORRECTION

Patent No. 3,505,278     Dated April 7, 1970

Inventor(s) Vito D. Elarde, Edward A. Potocki and Henry M. Gajewski

It is certified that error appears in the above-identified patent and that said Letters Patent are hereby corrected as shown below:

<u>In the heading</u>:

Line 4 after the title and after "60053" insert the following:

assignors to The Bunker-Ramo Corporation, a corporation of Delaware.

Line 5, "Continuation-in-part" should read -- Division --.

<u>In the specification</u>:

Line 1, "continuation-in-part" should read -- division --.

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents

FORM PO-1050 (10-69)